Dec. 1, 1942.  R. FOLLICK  2,303,732
COWL FLAP MECHANISM
Filed Nov. 6, 1939  3 Sheets-Sheet 1

INVENTOR.
RALPH FOLLICK
BY
ATTORNEY.

Dec. 1, 1942.    R. FOLLICK    2,303,732
COWL FLAP MECHANISM
Filed Nov. 6, 1939    3 Sheets-Sheet 2

INVENTOR.
RALPH FOLLICK
BY
ATTORNEY.

Dec. 1, 1942.　　　　R. FOLLICK　　　　2,303,732
COWL FLAP MECHANISM
Filed Nov. 6, 1939　　　　3 Sheets-Sheet 3

INVENTOR.
RALPH FOLLICK
BY
ATTORNEY.

Patented Dec. 1, 1942

2,303,732

UNITED STATES PATENT OFFICE 2,303,732

COWL FLAP MECHANISM

Ralph Follick, San Diego, Calif., assignor to Consolidated Aircraft Corporation, a corporation of Delaware Application November 6, 1939, Serial No. 303,033

8 Claims. (Cl. 189—54)

My invention relates to improved means for mounting, linking and operating fluid flow flaps which form a part of a cowling for an aircraft engine or of a ventilating duct or the like.

An object of the invention is the provision of means for manually, or otherwise, adjusting a series of fluid controlling flaps pivotally mounted in, or adjacent to, the surface of an aircraft cowling, the inlet or outlet of a ventilating system, or wherever an installation of control vanes may be desirable.

Another object is to provide operable means for simply and positively adjusting such flaps and for causing some or all of the flaps to move in unison to regulate the extent of the openings, which in the case of an engine cowl are curved in form, through which the cooling air to the engine is exhausted to the atmosphere.

A further object is to provide such operable means in a simplified construction whereby its weight and cost are reduced through elimination of torque shafts, universal joints, chains, sprockets, gears, flexible shafts and other devices now generally employed in the operation of aircraft cowl flaps.

Other objects are to provide means of linking and operating such flaps composing either a closed or open circuit of flaps; to reduce the cost of manufacture and replacement of parts through simplicity of construction; to eliminate lost motion between flaps and losses due to friction and inertia in existing methods of linkage; and to eliminate the necessity of torque shafts and reinforcing webs to transmit torque from one end of the flap to the other, thus reducing the resistance to the passage of the cooling air through the system.

These and other objects and advantages will appear during the course of the following description and may be readily understood; reference being made to the accompanying drawings, forming a part hereof, in which.

Figure 1:
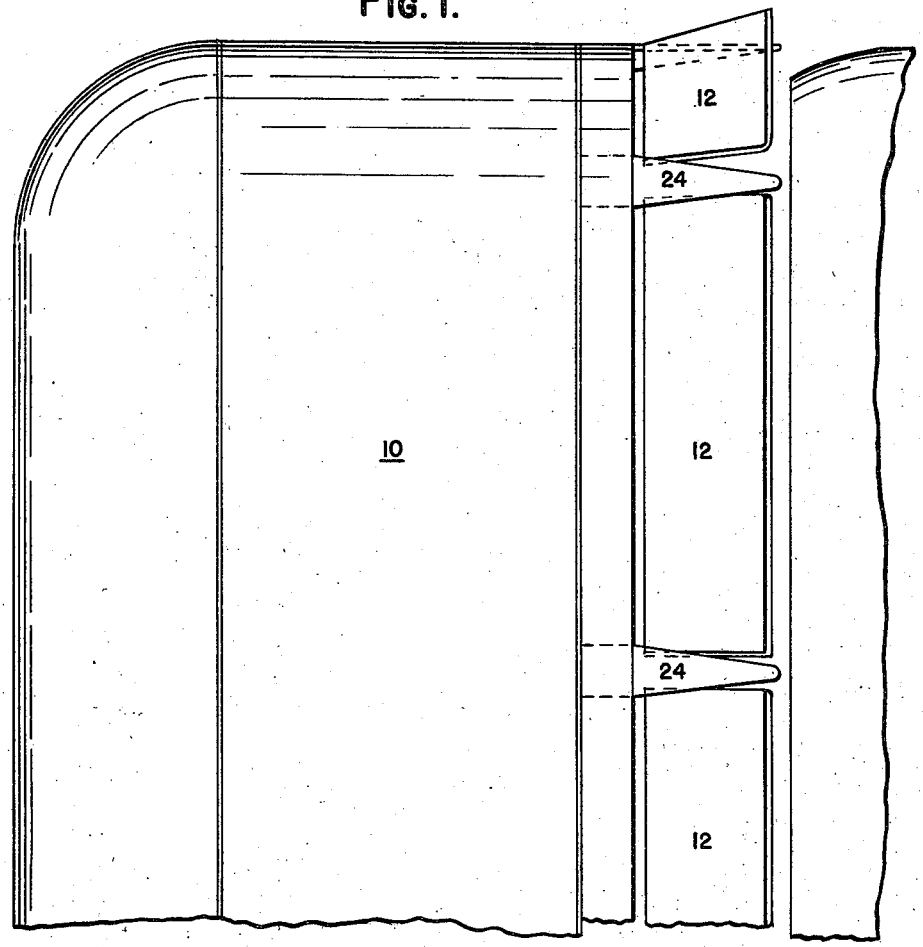
Figure 1 is a partial side view of an engine cowl with its associated adjustable flaps in an open attitude.
Figure 2:
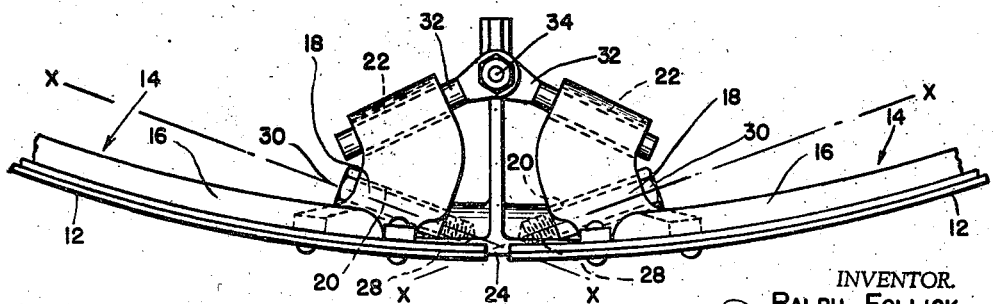
Figure 2 is a partial end view of the two lowermost flaps of the series showing one means by which they are pivotally mounted and linked together.

Referring to the drawings in detail, there is shown in Figure 1 a curved aircraft engine cowl 10 fitted with adjustable flaps 12 disposed at the trailing edge of the cowl. A feature of the invention may be briefly stated to lie in the fact that but one flap 12 need be manually or otherwise actuated so as to move between its open and closed positions; such opening or closing movement being torsionally transmitted through the structure of the flap itself to the point of pivotal mounting of the flap, and at this point the torsion is coupled or "bridged over" the hinge by a set of linked plungers and is thus carried into the adjacent flaps in the series.

Any number of flaps may be employed; however, for purposes of illustration, the invention has been shown in connection with an engine cowl 10 having approximately seven flaps. These seven flaps, such as 12, may be linked together in one series or in certain installations it may be desirable to have two or more separate linkages each including two or more flaps which may be separately controlled from the pilot's cockpit. Such an arrangement is entirely within the purview of this invention and the manner of its accomplishment will become more apparent as this description proceeds.

Thus the preferred construction by which the invention is carried into practice consists essentially of torsionally stiffened flaps linked together by special hinge devices and one means of providing such torsional stiffness in the flaps 12 lies in attaching, to its inside edge, a rigid frame 14 in which one or more semi-circular beads 16 are pressed. Such a bead may be of continuous rectangular form so that the flap will be stiffened not only along its length but also across its width.

Figure 5:
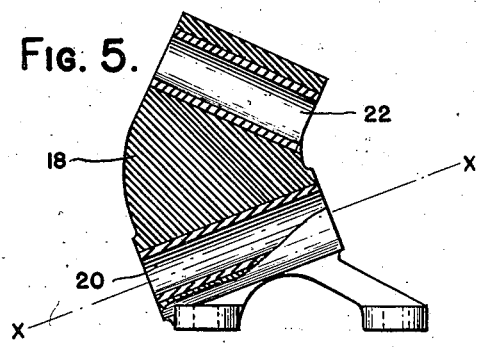
Figure 5 is a cross-section of a preferred form of one of the flap mounting bearings.

At each end of the flap 12 there is rigidly attached a flap bearing 18 each containing a self-lubricating bushing 20 by which the flap 12 is pivotally mounted and also a second self-lubricating bushing 22 (see Fig. 5). These two bushings are respectively held in bores which are axially inclined to each other at an angle of about 45°. The axis of rotation X—X of each flap 12 coincides with the axis of the bolt bushing 20, thus permitting the flap to rotate about this axis. At approximately equally spaced positions at the rear of the engine cowl are installed flap supports 24 which are retained in place by means of bolts 26. Each of the supports 24 contain two internally threaded holes 28 which extend in approximately opposite directions and whose axes lie in the same plane and contain the axes X—X of rotation, of the two flaps adjoining the support. When finally assembled each flap 12 is mounted on or between two supports 24 by means of bolts 30 which are passed through the previously mentioned bolt bushings 20, to threadedly engage the holes 28, in which they may be secured by any suitable lock means so as to permit the flap to turn freely without there being any danger of accidental loosening of the parts.

Figure 6:
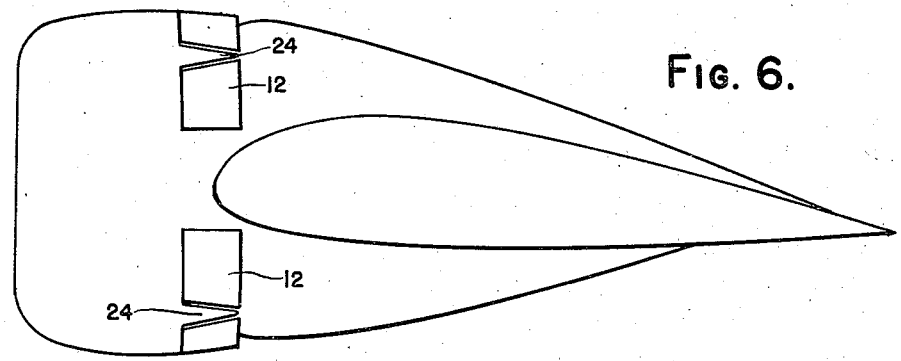
Figure 6 is a side elevation of an engine cowl showing a discontinuous series of flaps.

In each plunger bushing 22 is installed a plunger 32 and each pair of plungers of adjacent flaps is linked in pivotal relationship by means of a bolt and lock-nut combination 34. This installation is such as to permit both free sliding and rotation of the plungers in their respective bushings and also pivotation with respect to each other. Thus is created a closed system or series of flaps, each flap of which will move in unison with and to the same extent as the others, by virtue of the flexible couplings described. However, as before indicated, it is not necessary to have a closed system as one or more flaps may be modified in size or omitted entirely, provided that no gaps are made in each linkage series. (See Fig. 6.) The three axes, i. e., those of the two plungers 32 and the pivot bolt 34, intersect at a single point permitting free rotation wihout locking or wedging.

Figure 3:
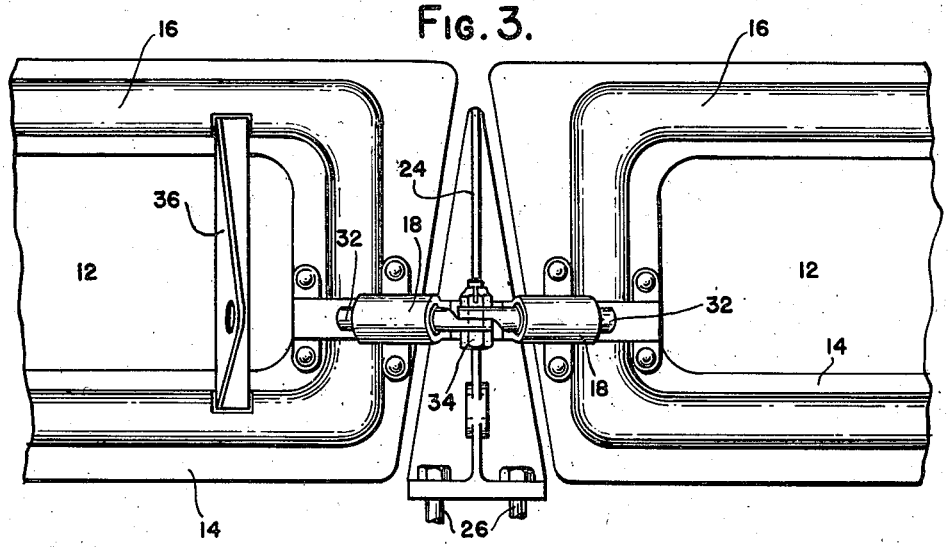
Figure 3 is a view looking down on top of a linkage mechanism similar to that shown in Figure 2.
Figure 4:
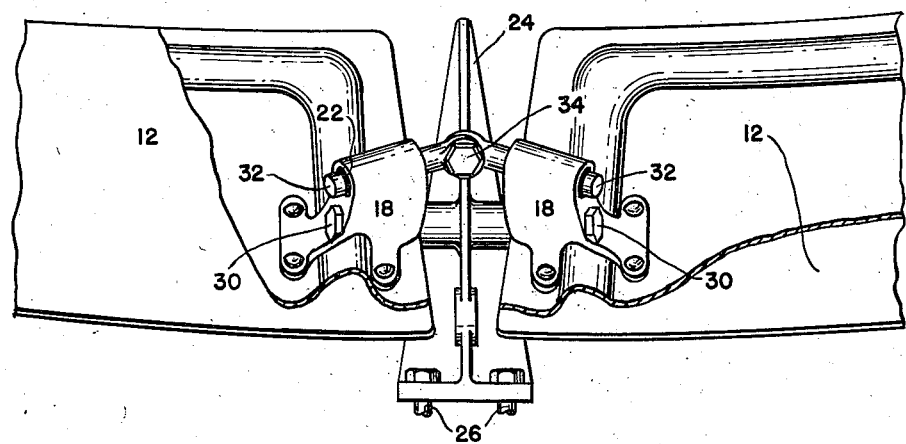
Figure 4 is a perspective representation of the linkage mechanism with the flaps in open position.

Regardless of whether a closed or open series of flaps is employed, means must be provided for imparting the opening or closing movement to the system. Such means, which does not form a novel part of this invention, may take the form of any of the motion transmitting devices now in common use. In Figure 3, the left-hand flap 12 is shown provided with a rigidly attached bracket 36 to which may be connected the terminal portion of a Bowden wire, a link and lever system, or other suitable actuating means. The control may be positive push-pull, or one-way positive with spring return. In any event, the flap operation is similar since, as force is applied to the bracket 36, the flaps 12 start to open from the fully closed position by turning about the axes X—X and at the same time the plungers 32 turn in their bearings 22 while sliding a limited amount axially thereof. On closing, the action is in exactly reverse sequence. A point of note is that the plungers are made of sufficient length to prevent disassembling with the flaps in full open position and incidentally, with this construction, the flaps may have an opening movement of as much as about 80°.

This invention provides flap installations of relatively light weight and low cost due to its simplified construction, and the design is widely adaptable to all sizes of engine installations.

Figure 8:
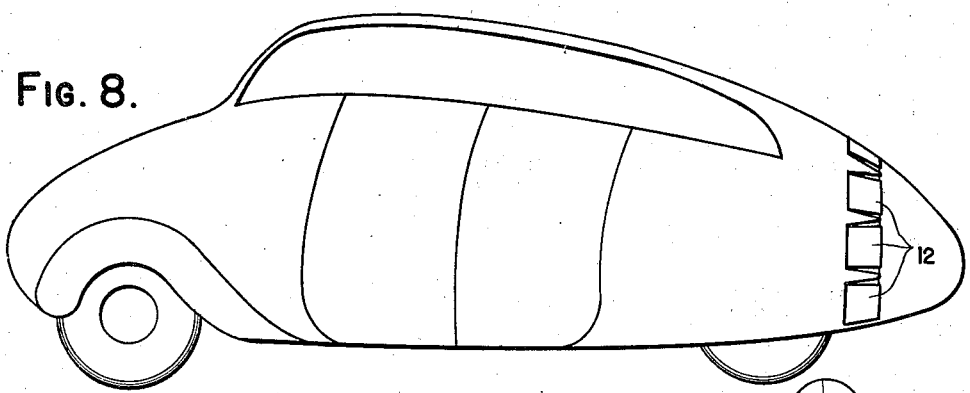
Figure 8 is a side elevation of an automobile in which a series of flaps are installed.
Figure 7:
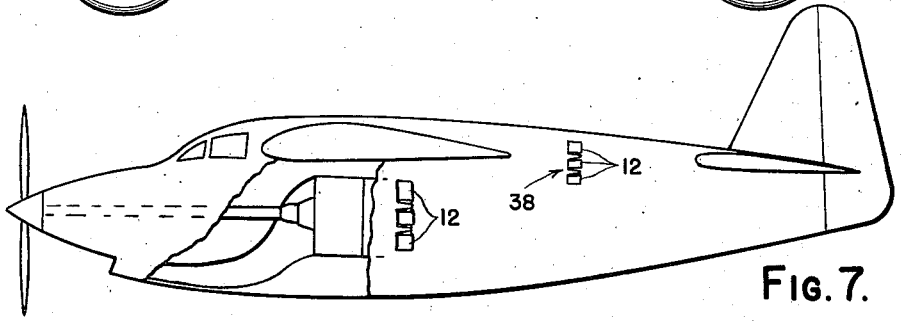
Figure 7 is a side elevation of an aircraft disclosing another type of installation of ventilation flaps.

A particular construction has been shown in the various figures of the drawings but it is not intended that the invention be limited thereto. For instance, the flap bearing 18 has been shown as a unitary structure but there is no necessity for its being made so. The bushings 20 or 22 could be mounted in separate structures but the unitary form has been employed in the interests of compact design. Various other modifications can be employed and all such changes are declared to lie within the scope of this invention subject to the limitations imposed by the appended claims. Furthermore, the invention has been shown as useful in connection with the cooling of propulsive engines of automotive vehicles as shown in Figs. 7 and 8 but it is not limited to such employment. For instance, it could be applied to flaps to control the inlet and outlet air for the ventilation of vehicle passenger compartments as shown at 38 in Fig. 7. Another use would be in the operation of control gates on ship bottoms to regulate the inlet and outlet of sea water. Or it might be employed on flap valves in air conditioning ducts or for the variable mixing of different gases, liquids, grain, or powdered materials. Such are but a few of the employments of the present invention.

What I claim is:

1. Interconnection means adapted for use between movable members required to pivot about relatively inclined axes comprising three pivotal connections of rigid connection elements interlinking the movable members with their pivot axes intersecting at a point, said connection elements comprising a pair of plunger members, and means carried by said movable members to each pivotally receive one of said plunger members, two of said pivotal connections being additionally adapted for axial sliding movement occurring between the movable parts thereof.

2. Interconnection means for use between movable members required to pivot about relatively inclined axes, comprising an intermediate joint member, a pair of pivot members connected thereby, and a pair of rigid members mounted on the said movable members each adapted to receive one of the said pivot members for rotational and longitudinal translational movements.

3. A hinged device adapted to transmit movement between closure vanes required to move simultaneously about relatively inclined axes, comprising an intermediate joint member, a pair of sliding pivot members pivotally joined by said intermediate joint member, a pair of receptacle members rigidly mounted in opposed attitude upon adjacent closure vanes to each slidably and pivotally receive one of said sliding pivot members, and a pair of rotational pivots extending through said receptacle members for purposes of pivotally mounting said closure vanes and the associated hinge device.

4. In a hinge mechanism interconnecting adjacent units in a curving series of adjustable control flaps in which the hinge axis of each flap is disposed at an angle to the hinge axes of the adjacent flaps, means for transmitting torque between adjacent flaps in the series comprising a linkage of plunger members pivotally connected to and relatively translatable with respect to said flaps, including pivotal means for joining adjacent plunger members in pairs.

5. Interconnection means adapted to transmit torque movements between adjacent pivotally mounted members, the said interconnection means comprising a pair of plunger receptacles mounted one on each of said members, a pair of plunger units each rotatable and slidable in one of said plunger receptacles and means pivotally interconnecting the projecting portions of said plunger units.

6. A hinge mechanism organized to pivotally interconnect a pair of movable members disposed on angularly related axes, including a pair of plunger receptacles respectively mounted on each of the movable members, a pair of plungers each adapted to be received in one of said receptacles for rotational and longitudinal translational movements and pivot means interconnecting the components of said pair of plungers for conjoint movement.

7. Interconnection means for use between adjacent pivotally movable members mounted on angularly related axes, the said interconnection means comprising a pair of plunger receptacles attached one to each of said members, a pair of plunger units each rotatable and slidable in one of said plunger receptacles, pivot means to connect the projecting portions of said plunger units and second pivot means comprising a bearing element formed in each of said plunger receptacles for the purpose of mounting the pivotally movable members on supporting structure through the intermediacy of said interconnection means.

8. Interconnection means for use between movable members required to pivot about relatively inclined axes, comprising an intermediate joint, a pair of pivot members articulated at said joint and a pair of body members mounted on the said movable members each including a receptacle adapted to slidably and pivotally receive one of the said pivot members.

RALPH FOLLICK.